Aug. 8, 1961  H. M. FOX  2,995,008
FUEL AND OXIDANT CONTROL SYSTEM AND PROCESS FOR
VARIABLE THRUST ROCKET AND JET ENGINES
Filed Feb. 26, 1953  2 Sheets-Sheet 1
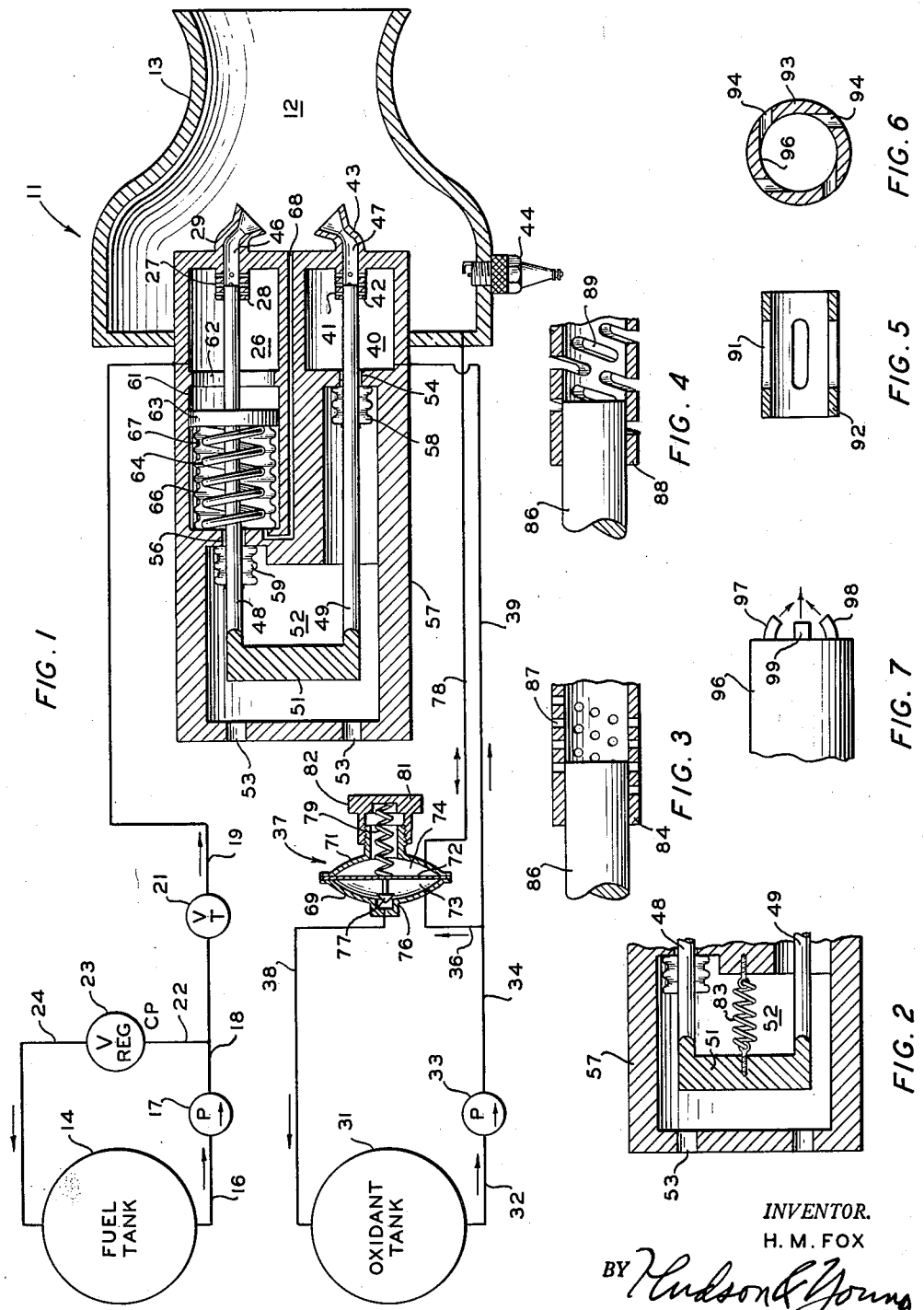
INVENTOR.
H. M. FOX
BY Hudson & Young
ATTORNEYS

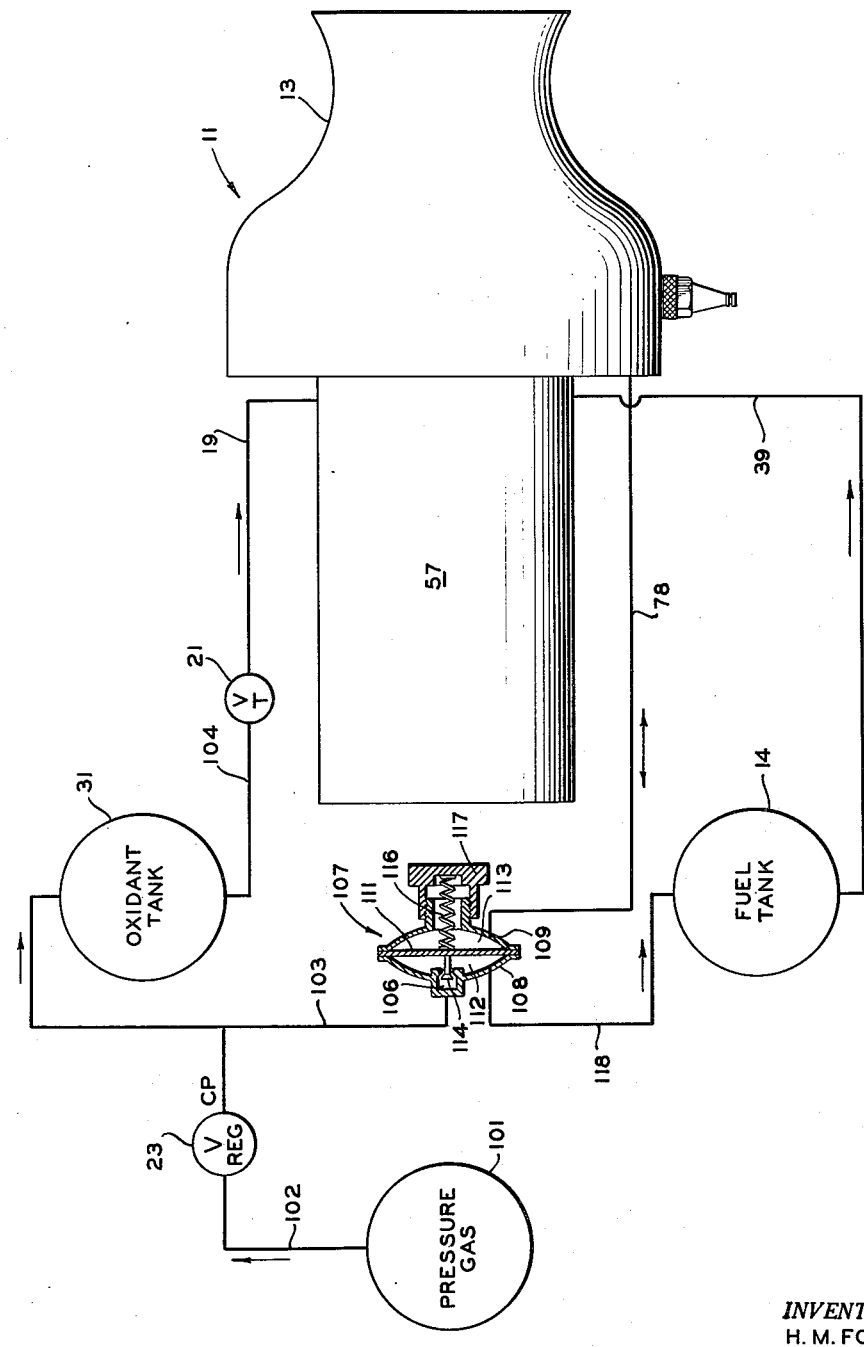

_United States Patent Office_

2,995,008
Patented Aug. 8, 1961

2,995,008
FUEL AND OXIDANT CONTROL SYSTEM AND PROCESS FOR VARIABLE THRUST ROCKET AND JET ENGINES
Homer M. Fox, Bartlesville, Okla., assignor to Phillips Petroleum Company, a corporation of Delaware
Filed Feb. 26, 1953, Ser. No. 338,945
4 Claims. (Cl. 60—35.6)

This invention relates to fuel and oxidant control systems and processes for variable thrust rocket engines. In another aspect such systems and processes may also be employed in jet engines, or any engine in which a propulsive stream of gas is produced, especially the ram jet, turbo-jet, and turbo-prop types of jet engines. In another aspect it relates to systems and processes for controlling and maintaining the fuel to oxidant ratio throughout a range of variable thrust of such rocket and jet engines.

Certain details of construction of the variable-area fuel nozzle are similar to those shown in my copending application Serial No. 203,994, filed January 2, 1951, now U. S. Patent 2,661,243 of December 1, 1953.

For any given rocket engine propellant-oxidant system, there is an optimum propellant-oxidant ratio at which the engine should operate considering such performance criteria as burning rate, burning efficiency, specific impulse and relative costs of propellant and oxidant. In the prior art, attempts to maintain this propellant-oxidant ratio over a considerable range of thrust have been unsuccessful whether the control was attempted by means of variable throttling orifices or injectors, because when the injection pressure was regulated, the pressure drop across the injector orifice and the flow varied widely. As the flow varied over an appreciable range, the discharge coefficient and fixed velocities changed sufficiently to adversely affect the flow of power. The mixing, atomization, resultant momentum and impingement pattern, all varied from those prevalent from rated conditions, and combustion instability and lower performance resulted. The variation of flow through any fixed orifice injector hole should therefore be limited.

Because of these difficulties in the prior art, extremely complicated and unreliable systems have been evolved using multiple rocket motors, each of which operates at, or near, rated conditions, in which systems the thrust is varied by turning individual motors on or off. The thrust in such systems varies by steps, each step being as large as the thrust of the rocket motor which is turned on, another objection being that the equipment necessary to properly turn a rocket motor on or off without explosion is relatively complex and far from being trouble free. While such multiple rocket motor systems of the prior art have been used both in guided missiles and manually operated aircraft, they are not regarded as satisfactory due to rough, jerky and unreliable operation, due to waste of power as the engines are separately started, and the fact that the most difficult thing about running a rocket motor is starting it so as to achieve smooth and even combustion without a dangerous explosion.

The present invention avoids these difficulties of the prior art by a novel approach to the problem, by employing fuel and oxidant nozzles having a variable inlet area in which the flow through any fixed orifice is constant but the number of orifices discharging into a single nozzle is variable by small increments instead of large steps. Regardless of the number of orifices uncovered, the oxidant and fuel pass through their respective nozzles to a single flame in the chamber of the motor, thus avoiding starting difficulties occurring when multiple motors are turned off and on. The present invention supplies the fuel and oxidant to the respective nozzles at a pressure that is a constant amount higher than combustion chamber pressure, and at a constant propellant-oxidant ratio over a wide range of propellant flow rates to provide a wide range of controlled thrust.

One object of the present invention is to provide a simple, reliable means of maintaining the propellant-oxidant ratio constant over a wide range of thrust.

Another object is to provide optimum conditions for mixing of fuel and oxidizer under all conditions of the operation of a rocket engine.

Another object is to provide an improved fuel and oxidant control system for variable thrust rocket and jet engines, and processes of operating the same.

A further object is to provide a novel variable thrust rocket or jet engine and a novel burner for the same.

Numerous other objects and advantages will be apparent to those skilled in the art upon reading the accompanying specification, claims and drawings.

In the drawings:
FIGURE 1 is a partially diagrammatic, partially sectional, elevational view of a control system and rocket engine embodying the present invention.

FIGURE 2 is a cross-sectional view of a modified portion of FIGURE 1 showing how a tension spring can be substituted for the compression spring in FIGURE 1.

FIGURES 3, 4 and 5 are cross-sectional views taken along the longitudinal axis of three different modified injector orifice tubes, any one of which could be substituted for the type shown in FIGURE 1.

FIGURE 6 is a transverse cross-sectional view of a fifth type of injector orifice tube in which the orifices are arranged tangentially relative to the cylindrical inner surface of the tube.

FIGURE 7 is an eleveational view of a broken away portion of the burner of an engine in which one of the reactants emerges through a substantially axial nozzle and the other reactant emerges from a plurality of nozzles with an inward radial component so as to impinge with the stream of the first reactant.

FIGURE 8 is a diagrammatic view of a modified control system otherwise similar to FIGURE 1.

In FIGURE 1 a rocket engine generally designated 11 comprises a combustion chamber 12 and a velocity increasing, flaring nozzle 13 of conventional form. The first reactant, which in the embodiment shown in FIGURE 1 is any suitable fluid propellant, or fuel, either a gas of a liquid, but preferably a liquid such as ethyl alcohol, is stored in fuel tank 14. Fuel from tank 14 is withdrawn through line 16 by pump 17 and passed under pressure into line 18, from which it passes into feed line 19 at a variable rate of flow controlled by manually variable throttle valve 21. Manual throttle valve 21 may be operated directly or through remote control (not shown) to adjust the flow of fuel from line 18 to 19 in accordance with the wishes of the operator, or any other parameter of control instrumentality (not shown).

In order to provide a constant pressure in line 18, a by-pass line is connected thereto and to tank 14, said by-pass line comprising a conduit 22 communicating with pipe 18, connected to tank 14 by conduit 24, conduit 22 and 24 communicating with each other through a regulating valve 23 designed to maintain a constant pressure in line 18 and 22 of any predetermined suitable valve, for example, 500 pounds per square inch, all pressures given as examples being gauge pressures, which means pressures above atmospheric pressure. Obviously any other pressure below the bursting strength of pipes 18 and 22 could be employed, and the same is true of all other pressure examples which will be given, it being understood that such examples are given for the purpose of illustration and not for limitations of the scope of the invention.

The fuel coming through throttle valve 21 moves through conduit 19 into chamber 26 at a superatmospheric pressure which may be about 200 pounds per square inch. From chamber 26 the fuel passes through orifices 27 of the cylinder 28 of a variable-area inlet nozzle 29 into combustion chamber 12.

The pressure in combustion chamber 12 may be about 125 pounds per square inch so that there is a pressure drop in coming through orifices 27 and nozzle 29 of about 75 pounds per square inch.

The second reactant, which in the embodiment shown in FIGURE 1 is the oxidant, preferably liquid oxygen, is stored in tank 31. However, it is believed obvious that the system shown in FIGURE 1 will operate just as well with the oxygen placed in tank 14 and the fuel in tank 31. While the preferred reactants are liquid ethyl alcohol and liquid oxygen, other reactants may be employed, for example, any pair of reactants set forth in the articles "Rocket Engine Fuels," by R. McLarren in Automotive and Aviation Industries, August 15, 1946, "The Petro Chemical Engineer Looks at Rocket Fuels," by Sittig in Petroleum Refiner, vol. 50, No. 5, May 1951, or similar articles of the prior art.

The oxidant in tank 31 therefore may be a gas, but preferably is a liquid, and as examples of suitable liquid oxidants, liquid oxygen, or concentrated liquid hydrogen peroxide is preferred. When concentrated hydrogen peroxide is used it preferably consists of over 70 percent hydrogen peroxide, the remainder being mainly water, the percentage of hydrogen peroxide can range as high as that which may be commercially available, at present that being about 90 to 95 percent hydrogen peroxide. It should be understood the type of fuel and oxidant is immaterial as long as they will react and produce a fluid having suitable escape velocity in chamber 12.

Oxidant from tank 31 is withdrawn through line 32 by means of pump 33 and placed under pressure in pipe 34. When a predetermined pressure is exceeded, excess oxidant in pipe 34 passes through bypass line 36, differential pressure regulator 37 and return line 38 back to tank 31. Tanks 14 and/or 31 may be provided with conventional pressure relief valves (not shown) venting to the atmosphere if desired. The oxidant from line 34 passes through line 39 into chamber 40 at a pressure of about 200 pounds per square inch from which it passes through orifices 41 and cylinder 42 and nozzle 43 into chamber 12 into impingement with the stream of fuel emerging from nozzle 29 with about the same pressure drop occurring in nozzle 43 as occurred in nozzle 29.

Certain combinations of fuel and oxidant are hypergolic, for example, aniline as fuel and red fuming nitric acid as oxidant will ignite and commence reacting upon contact, but other combinations of reactants such as ethyl alcohol and oxygen require ignition, which may be supplied by an ignitor, such as a spark plug 44 and suitable ignition system (not shown) of the prior art.

Variable-area inlet fuel nozzle 29 and oxidant nozzle 43 are similarly constructed. Each has a cylinder 28 and 42, respectively, in which there are a plurality of fixed orifices 27 and 41, respectively, which orifices afford communication between chambers 26 and 40 with the interior passages 46 and 47 of nozzle 29 and 43 respectively. A valve, or obturating piston, 48 is slidably mounted in sleeve 28 to cut off flow through one or more of orifices 27 depending upon its position and a similar valve or piston 49 is similarly positioned in cylinder 42 for the same purpose relative to orifices 41. In order that the ratio of area of flow through nozzles 29 and 43 will be the same at all times, a bar 51, or other rigid connecting means, is provided between pistons 48 and 49 so that they will move in unison. As the pressure in chamber 52 is immaterial, vents 53 may be provided, if desired, to relieve any accidental buildup of pressure due to some accidental leak.

While piston 49 may pass through any conventional packing such as a stuffing box at 54 (not shown) and piston rod 48 may pass through a similar packing at 56 (not shown) in body 57, I prefer to seal the pressure in chambers 40 and 26 by means of transversely corrugated metal bellows 58 and 59 respectively, the ends of which are welded or soldered to pistons 49 and 48 respectively and to the body at 54 and 56 respectively. In body 57 a cylinder 61 is formed having open communication with chamber 26 through opening 62. Slidably fitting into cylinder 61 is a piston 63 rigidly connected to piston 48, and biasing means, such as helical compression spring 64, is provided between shoulder 56 and 63 to bias the piston 63 and piston 48 to the right, closing orifices 27. While the fit of piston 63 in cylinder 61 could in many instances be relied on to prevent the passage of pressure between chamber 26 and space 66 behind the piston, especially if piston 63 were provided with conventional piston rings or resilient O rings (not shown), it is preferred to seal off space 66 by means of a metallic transversely corrugated cylindrical bellows 67 having its ends secured by soldering or welding to shoulder 56 and to piston 63. Housing 57 is shown integral, but may be obviously made in sections secured together by suitable means, such as threads, bolts, welding, soldering or brazing, to aid in assembly. Combustion chamber pressure from combustion chamber 12 is transmitted to space 66 by means of a conduit 68 in the body 57.

The differential pressure regulator 37 may be of any type known to the prior art, the form shown in FIGURE 1 being one of the simplest forms available and consisting of two concave housings 69 and 71 with a flexible diaphragm 72 secured therebetween separating regulator 37 into two chambers 73 and 74. Chamber 73 communicates with pipe 36 and through valve seat 76 with pipe 38, the flow of fluid from chamber 73 through valve seat 76 into pipe 38 being controlled by a valve 77 rigidly mounted on diaphragm 72. Chamber 74 is brought to the same pressure as combustion chamber 12 by means of a communicating conduit 78. Diaphragm 72 is biased to close valve 77 on seat 76 by suitable biasing means, such as a helical compression spring 79, the compression and force of which may be varied by an adjustable screw cap 81 which may be provided with a tool engagement surface 82, if desired.

FIGURE 2 shows how a helical tension spring 83 may be provided between bar 51 and body 57 to bias pistons 48 and 49 to the right in place of, or in addition to, spring 64 of FIGURE 1, and it is obvious either one or both of springs 64 and 83 may be employed as desired.

FIGURE 3 shows a modification in which a cylinder 84 (corresponding to cylinders 27 and 42 of FIGURE 1) is provided with a helical series of orifices 87, each orifice overlapping in an axial direction the adjacent orifices so that as piston 86 is moved down cylinder 84 the flow of fluid through orifices 87 will be gradually reduced uniformly.

FIGURE 4 is similar to FIGURE 3 except that the orifices in cylinder 88 are made in an elongated helical form as shown at 89.

FIGURE 5 is similar to FIGURE 4 except that the axis of the elongated orifices 91 in cylinder 92 are longitudinal of cylinder 92, and orifices 91 can extend the full length of travel of the piston (not shown but similar to piston 86).

FIGURE 6 shows how a similar orifice cylinder 93 can be provided with orifices 94 which are disposed tangentially to the inner surface 96 of the cylinder. This tangential arrangement can be applied to any of the orifices in any of the cylinders of FIGURE 1, 3, 4 or 5 if desired. This tangential direction of the orifices tends to improve the atomization of the liquid passing through the nozzle; however, as the streams from nozzles 29 and 43 impinge on each other, and are thereby further atomized and mixed, it is not essential that the orifices be tangential as are orifices 94 in FIGURE 6, as valuable results are obtained with radial orifices as shown in the other figures.

FIGURE 7 shows the nozzle end of a modified body 57 of FIGURE 1 which is given the number 96. It is often desirable to have a plurality of nozzles of one or more of the reactants, for example the oxidant could be discharged with a radial inward component of motion from a plurality of nozzles 97 and 98 while fuel could be discharged from nozzle 99 in an axial direction, as shown by the arrows, so that impingement occurs. Or the fuel could come in through the plurality of nozzles 97 and 98 and the oxidant come in through nozzle 99. For example, one fuel nozzle could be surrounded by four oxidant nozzles, or any ratio of fuel propellant nozzles to oxygen nozzles of the same size, or of different sizes, could be used. Each nozzle 97, 98 and 99 may contain a separate piston similar to pistons 48 and 49 of FIGURE 1 (not shown) and the impingement can be aided by bending the nozzle ends as shown in FIGURE 7. By employing suitable linkages (not shown) of an obvious nature between the pistons the longitudinal axes of the various nozzles could be made to converge even though the nozzles were straight, by disposing the longitudinal axes of the orifice cylinders and the pistons therein in a converging pattern (not shown).

FIGURE 8 shows a modified pressure control system utilizing the force of an inert gas under pressure in tank 101 in place of pumps 17 and 33 of FIGURE 1 to move the oxidant from tank 31 and the fuel from tank 14 to the engine 11. In order to demonstrate the interchangability of oxidant and fuel, tanks 14 and 31 are reversed in position in FIGURE 8 from their position in FIGURE 1. The inert gas in tank 101 is fed through line 102 and constant downstream pressure regulating valve 23 into manifold 103 leading to the top of both tanks 14 and 31, via line 118, which should either contain liquid fuel and oxidant respectively, or be divided into a pressure gas compartment and a reactant gas compartment by a very flexible diaphragm (not show) or by a piston (not shown). The use of liquid fuel and oxidant is preferred. The oxidant in tank 31 is driven out the lower pipe 104 under the same pressure as prevails in manifold 103 and is fed by throttle valve 21 into line 19 in the same manner as described above for throttle valve 21 in FIGURE 1, except that oxidant, instead of fuel, is being controlled.

Manifold 103 also feeds high pressure gas to chamber 106 of a differential pressure regulator generally designated as 107. Regulator 107 comprises two hemispherical shells 108 and 109 forming with a flexible diaphragm 111 secured therebetween two chambers 112 and 113. A valve 114 secured to move with diaphragm 111 controls flow between chambers 106 and 112, closing as valve 114 moves to the right in FIGURE 8. A helical compression spring 116 is a preferred means for biasing valve 114 and diaphragm 111 to the left with a constant force, which force may be adjusted to one of a range of predetermined values by threaded cap 117, as is commonly done in such regulators. Chamber 113 is connected to the combustion chamber 13 by a pressure transmiting pipe 78.

Inert gas under a pressure a constant predetermined amount above combustion chamber pressure in 13 is fed from chamber 112 to the top of fuel tank 14 through line 118 where it pressures the fuel as described above. The fuel flows from tank 14 through line 39 to housing 57 where it is connected the same as in FIGURE 1. Lines 19, 39 and 78 and engine 11 with housing 57 and combustion chamber 13 are identical in FIGURES 1 and 8 and therefore have the same reference numerals.

In the second sentence of the first paragraph of the present specification it is stated the invention may be employed in jet engines (not shown). The manner of employment is simple, burner 11 being disposed in said jet engine with nozzle 13 directed to discharge downstream into the flow of gases therethrough at any point at which it is known in the prior art to add sensible heat to said gases, either as the only source of heat, or as an auxiliary source of heat for said gases. For example, if the jet engine (not shown) has a burner section, or an after burner section, one or more of nozzles 13 can be disposed to discharge downstream into said gases in either or both of said sections.

*Operation*

Assume that pump 17 is creating a pressure of 500 pounds to the square inch on the fuel in line 18 in combination with the regulating valve 23 which is passing sufficient excess fuel through line 22 and 24 back to tank 14 to maintain the pressure in line 18 constant. Assume that throttle valve 21 is partially open, and that the fuel pressure in line 19, chamber 26 and cylinder 61 is 200 pounds per square inch. Assume that spring 64 exerts a force of about 75 pounds per square inch when the force is distributed over the area of piston 63, and that spring 64 is sufficiently long so that the maximum displacement of piston 48 from a position covering none of orifices 27 to a position covering all of them is short enough relative to the length of spring 64 so that the force exerted by the spring 64 will be substantially constant throughout this movement of piston 48.

There will then be a pressure in chambers 26 and 40 of 75 pounds per square inch above chamber 12, and a constant ratio of fuel to oxidant flow is maintained over the range of flows controlled by valve 21 which is a different predetermined ratio than that which is maintained when the differential pressures are different between chambers 26 and 12, and 40 and 12. The rate of flow through an orifice varies directly as the square root of the differential pressure across the same, and the spring forces at 64 and 79 necessary to maintain any constant predetermined fuel to oxidant ratio are easily calculated.

Assume now that the throttle valve 21 is opened to double the flow of fuel through line 19. The pressure in chamber 26 will go up momentarily, but this increase in pressure will drive piston 63 to the left causing piston 48 to open more of holes 27 until the pressure in line 19 and chamber 26 goes down to 200 pounds per square inch with the same 75 pound pressure drop through nozzle 29 to combustion chamber 12, but with twice the flow through line 19 because twice as many orifices 27 are open. Because of the bar 51, piston 49 is caused to open twice as many orifices 41. The pressure of oxidant in chamber 40 goes down momentarily but is rapidly brought back by the fact that valve 77 is urged against seat 76 throttling the flow through by-pass line 36, 38 back to oxidant tank 31 until twice as much oxidant flows through 39 as before, which raises the pressure in the chamber 40 back to 200 pounds per square inch, but with twice the rate of flow of oxidant through line 39 and nozzle 43, the area of flow into passage 47 having increased by the withdrawal of piston 49 to the left uncovering the corresponding increased number of orifices 41.

Assume then that due to this increased flow of fuel and oxidant into chamber 12, which occurs, however, at the same constant fuel-oxidant ratio of the former flow, the pressure in chamber 12 increases. In this event the increased pressure in chamber 12 is transmitted through conduits 68 and 78 and is balanced against the pressure of incoming oxidant and fuel, as pistons 48 and 49 will move in a direction restricting orifices 27 and 41 until such balance of pressure occurs. Therefore the pressure of fuel in chamber 26 and of oxidant in chamber 40 will rise as much above 200 pounds per square inch as the pressure in chamber 12 is above 125 pounds per square inch, and will always be a constant and equal amount above the pressure in chamber 12 regardless of the rate of flow through lines 19 and 39.

The operation of FIGURE 8 should be obvious by now. An inert gas, such as one selected from the group consisting of nitrogen, carbon dioxide, helium, ammonia, or in some cases even air, hydrogen, carbon monoxide, nitrogen oxides, sulfur dioxide or other readily available, relatively cheap gas inert to the material being pressured, is stored in tank 101 at a pressure, for example, in excess of 500 p.s.ig., say about 2,000 p.s.i.g. Regulator 23 reduces the pressure to maintain a constant pressure, for example, of 500 p.s.i.g. in manifold 103. Obviously, separate gases could be employed in separate tanks (not shown) to pressure separately tanks 14 and 31, in which case a different gas inert to each reactant could be employed without regard to whether it was inert to the other reactant. If desired with relation to tank 14 the regulating valve 23 could be eliminated, throwing all the pressure reducing load on valve 107, which is not recommended.

Assuming throttle valve 21 is partially open, and the pressure in line 19 is 200 p.s.ig., the combustion chamber pressure is 125 p.s.i.g. and spring 116 acting over the area of diaphragm 72 gives a pressure of 75 p.s.ig., then the pressure in line 118, tank 14 and line 39 will be held at 200 p.s.ig. Changes in throttle valve setting of valve 21 and resulting changes in combustion chamber pressure will be balanced in the same manner as discussed above in relation to the operation of FIGURE 1.

While the operations have been described entirely as the invention is applied to rocket motors, the invention can also be used in jet engines, such as ram jet, turbo-jet and turbo-prop types of jet engines (not shown) by using one or more of the burners 11 as the main, or auxiliary, burner, in the burner section of said jet engine, or as the main or auxiliary, burner in the after burner section of said jet engine, to add sensible heat to the gas stream passing through said jet engine.

The control system of the present invention as shown in any of the figures of the drawing can also be used in jet engines (not shown) in which fuel and an additive or combustion accelerator (liquid) are separately injected into the combustion zone. Use of said control system in such engines ensures the proper ratio of fuel to additive regardless of fuel flow.

While certain embodiments of the invention have been shown for purposes of illustration, the invention is not limited thereby.

Having described my invention, I claim:

1. A variable thrust jet engine comprising in combination a combustion chamber, said combustion chamber being connected in communication with a jet producing exhaust conduit, a first supply chamber for a first reactant, a second supply chamber for a second reactant, means for supplying said first reactant to said first supply chamber at a selected pressure, means to vary said selected pressure independent of combustion chamber pressure, an inlet conduit connecting each of said supply chambers respectively in communication with said combustion chamber, valve means connected and disposed to simultaneously control fluid flow through both inlet conduits in direct proportion by simultaneously varying the effective area of communication of each inlet conduit between its respective supply chamber and said combustion chamber, said valve means moving from a first position providing larger areas to a second position providing smaller areas for said communication, automatic control means for moving said valve means from said first position to said second position, means biasing said control means to move said valve means toward said first position by application of the pressure of said first reactant in said first supply chamber over a first area of said control means, means biasing said control means to move said valve means toward said second position by application of the fluid pressure in said combustion chamber over a second fixed area of said control means, means biasing said control means to move said valve means toward said second position by a predetermined force whereby said pressure in said first supply chamber is maintained higher than in said combustion chamber by a predetermined amount, and means for supplying said second reactant to said second supply chamber at a pressure a predetermined amount above said combustion chamber pressure, comprising a supply line connected to said second supply chamber, means supplying said second reactant under pressure to said supply line, a bleed line connected to said supply line, a valve connected in and controlling flow through said bleed line, a diaphragm motor connected to actuate said valve, means to transmit supply line pressure to one side of said diaphragm, means to transmit combustion chamber pressure to the opposite side of said diaphragm, and means biasing said diaphragm in the same direction as said combustion chamber pressure biases the same with a predetermined force.

2. The combination of claim 1 in which said valve means comprises cylinders communicating with said inlet conduits and extending into said respective supply chambers, a plurality of orifices in the walls of each cylinder, an obturating piston slidably mounted in each cylinder to progressively close said orifices, and means to move said pistons in unison.

3. The combination of claim 2 in which the orifices in the walls of each cylinder are semi-helical openings disposed in the form of a plural thread, with at least some of said orifices in different ones of said plural threads overlapping the face of said obturating piston in all positions, thereby providing a continuously variable effective area of said orifices as opposed to an area varying by discrete increments.

4. The combination of claim 1 in which said automatic control means comprises a cylinder connected in communication with said first supply chamber at one end and in communication with said combustion chamber at the other end, a piston rigidly connected to said valve means and slidably mounted in the central portion of said cylinder, and a spring biasing said piston toward the end of said cylinder in communication with said first supply chamber.

References Cited in the file of this patent
UNITED STATES PATENTS

| | | |
|---|---|---|
| 1,052,588 | Janicki | Feb. 11, 1913 |
| 2,406,926 | Summerfield | Sept. 3, 1946 |
| 2,616,254 | Mock | Nov. 4, 1952 |
| 2,632,298 | Willgoos | Mar. 24, 1953 |

FOREIGN PATENTS

| | | |
|---|---|---|
| 585,032 | Great Britain | Jan. 29, 1947 |